United States Patent [19]
Kennedy

[11] 3,794,818

[45] Feb. 26, 1974

[54] AUTOMATIC MEMORY TEST AND CORRECTION SYSTEM

[75] Inventor: Peter D. Kennedy, Casselberry, Fla.

[73] Assignee: The United States of America as represented by the Secretary of the Navy, Washington, D.C.

[22] Filed: July 3, 1972

[21] Appl. No.: 268,429

[52] U.S. Cl. ........................ 235/153 AM, 235/153 A
[51] Int. Cl. .................................................. G06f 11/00
[58] Field of Search . 235/153 AH, 153 AM, 153 A, 235/153 AC; 340/174 ED

[56] References Cited

UNITED STATES PATENTS

| | | | |
|---|---|---|---|
| 2,871,289 | 1/1959 | Cox et al. | 235/153 A |
| 3,008,129 | 11/1961 | Katz | 235/153 AM |
| 3,049,692 | 8/1962 | Hunt | 235/153 AM |
| 3,439,343 | 4/1969 | Stahle | 235/153 AM |
| 3,579,199 | 5/1971 | Anderson et al. | 235/153 AM |
| 3,714,571 | 1/1973 | Walker | 235/153 AC |

*Primary Examiner*—Charles E. Atkinson
*Attorney, Agent, or Firm*—R. S. Sciascia; J. W. Pease; J. F. Miller

[57] ABSTRACT

A simplified automatic electronic correction system for continually comparing the data on a tape being read into a memory with the data stored in the memory. When a discrepancy between the tape data and the memory data occurs the tape is automatically stopped and the erroneous item is read out of both the memory and the tape together with the item location onto suitable displays. Correction may be made automatically or manually.

5 Claims, 3 Drawing Figures

AUTOMATIC MEMORY TEST AND CORRECTION SYSTEM

BACKGROUND OF THE INVENTION

The invention is in the field of data processing. One of the major problems in the field concerns the transfer of data between devices such as computing, storage, and displaying elements and between these and various input and output devices. The probability of errors increases with the number of transfers and is greatest when the form of the information is changed during transfer, e.g., from say punched tape to magnetic or other forms of storage. The present invention overcomes this problem of the prior art by providing an improved circuit for automatically checking and correcting errors arising during the transfer of information between devices.

SUMMARY OF THE INVENTION

The invention comprises an improved circuit for detecting and correcting errors occurring during the transfer of information from a tape to a computer or storage device. Means are provided for continually comparing the information stored in a computer with like information on an input tape. Improved circuitry is provided for detecting and correcting any dissimilarities.

DESCRIPTION OF THE PREFERRED EMBODIMENT

Figure 1:
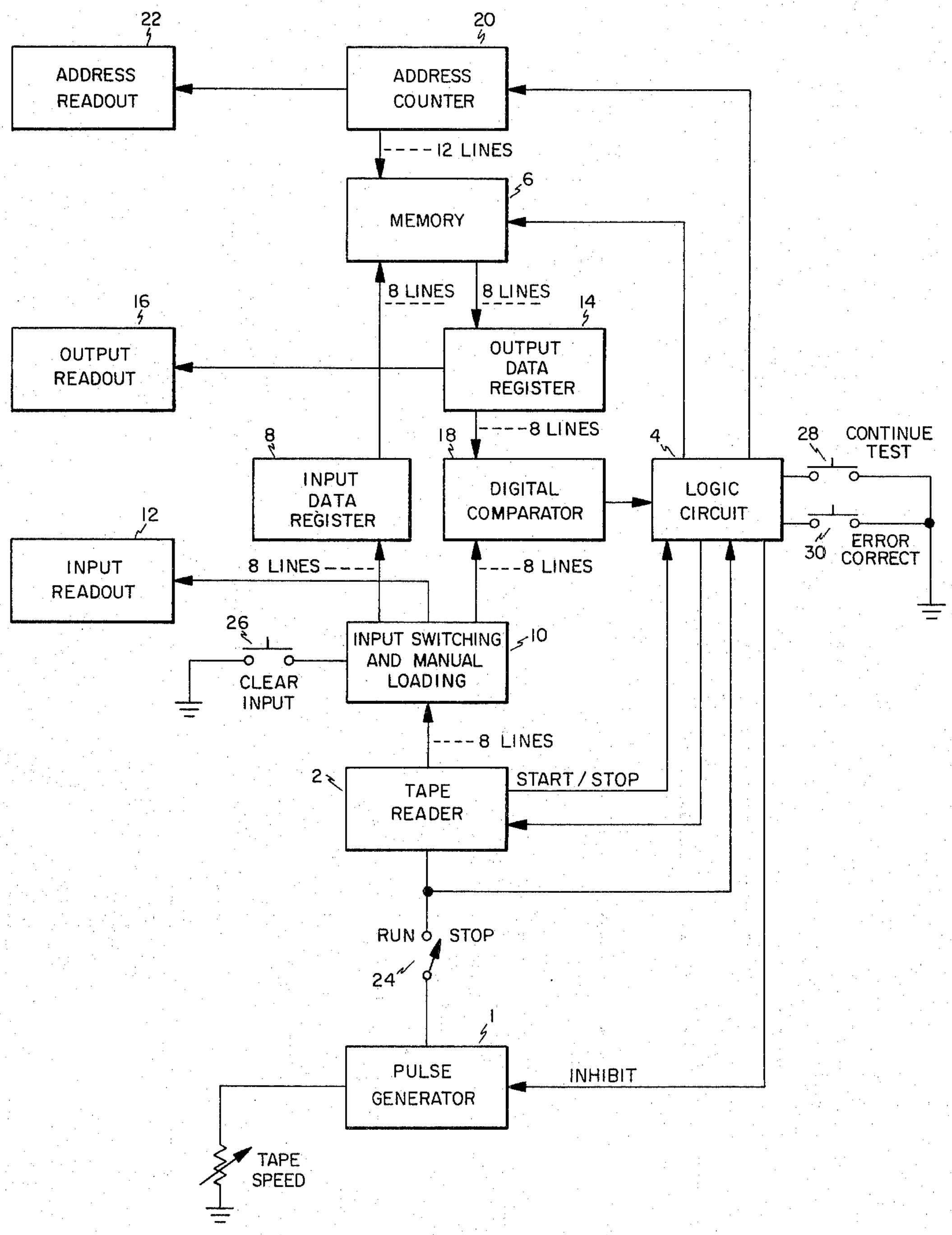
FIG. 1 is a block diagram of the invention.

FIG. 1 illustrates the relationships of the several elements comprising the invention. Here a pulse generator 1 supplies pulses to operate a tape reader 2. A pulse from 1 is also applied through a logic circuit 4 to a memory 6 to initiate a read or write cycle at each step of tape reader 2. The information output of tape reader 2 is supplied to an input data register 8 through an input switching and manual loading device 10 to load memory 6. The information output of tape Memory 6 is connected 10 also goes to an input readout 12 which continually displays the current data being read from the tape. Tape reader 2 also supplies start and stop commands to logic circuit 4. These commands are derived from the tape.

Figure 3:
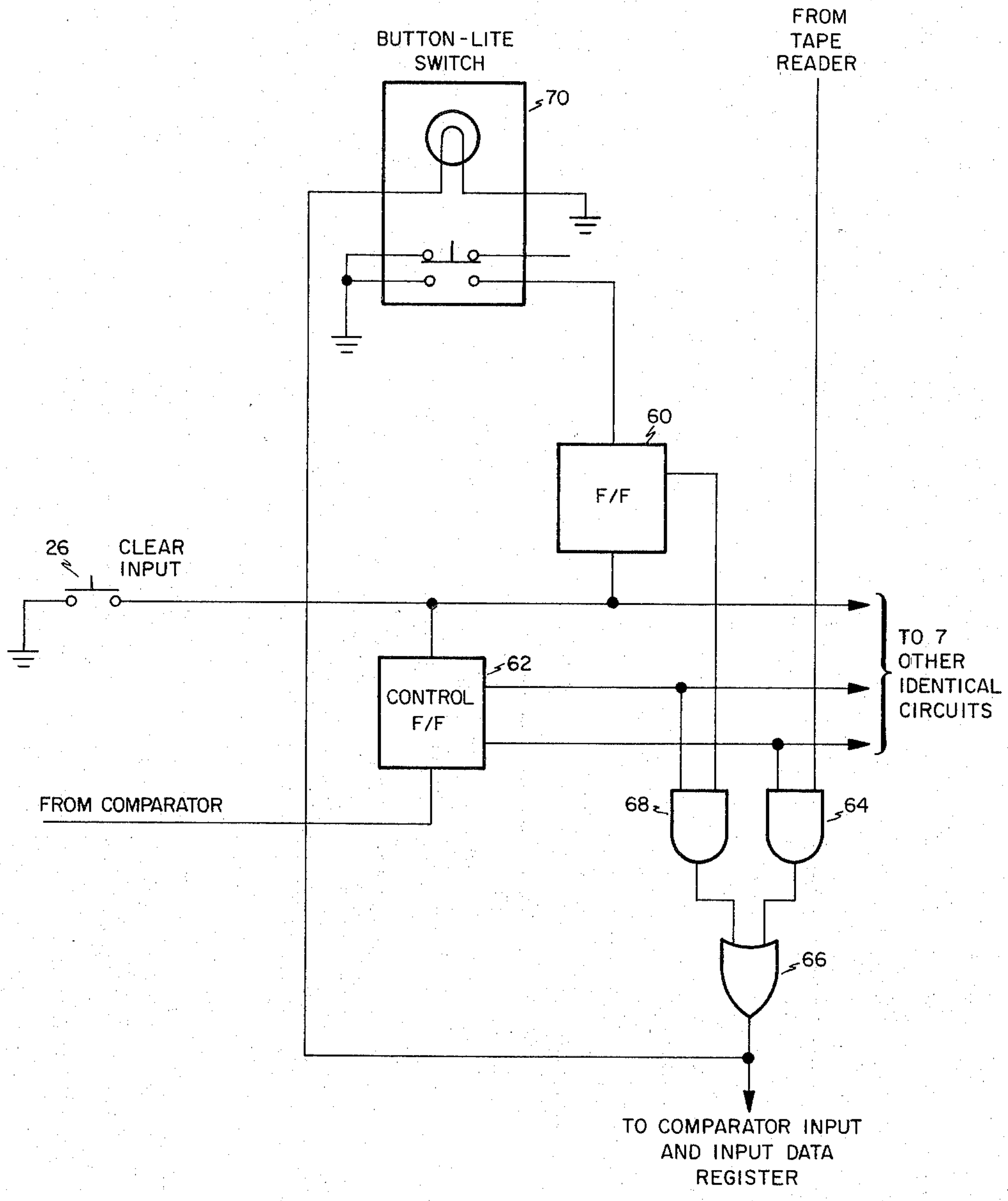
FIG. 3 shows the circuitry of block 10 in FIG. 1.

Memory 6 is connected to an output data register 14 which temporarily stores information being read out of the memory. A readout circuit 16 displays the information stored in register 14. A digital comparator 18 compares information in output data register 14 with information on the tape or on manual loading switches one of which is shown in FIG. 3. As long as both input signals to comparator 18 are identical the comparator forwards an output signal to logic circuit 4 which in turn enables pulse generator 1. Logic circuit 4 also forwards a "cycle initiate" pulse to memory 6 each time tape reader 2 steps. An address counter 20 is also enabled by logic circuit 4 to continually track the location in the memory of the bit or word being compared. Counter 20 enables an address readout circuit 22 to continually display the current address. Four operating switches are provided, a "run-stop" switch 24 between pulse generator 1 and tape reader 2, a " clear input" switch 26 between ground and the input switching and manual loading device 10 and a "continue test" switch 28 and a "correct error switch" each connected between logic circuit 4 and ground.

Figure 2:
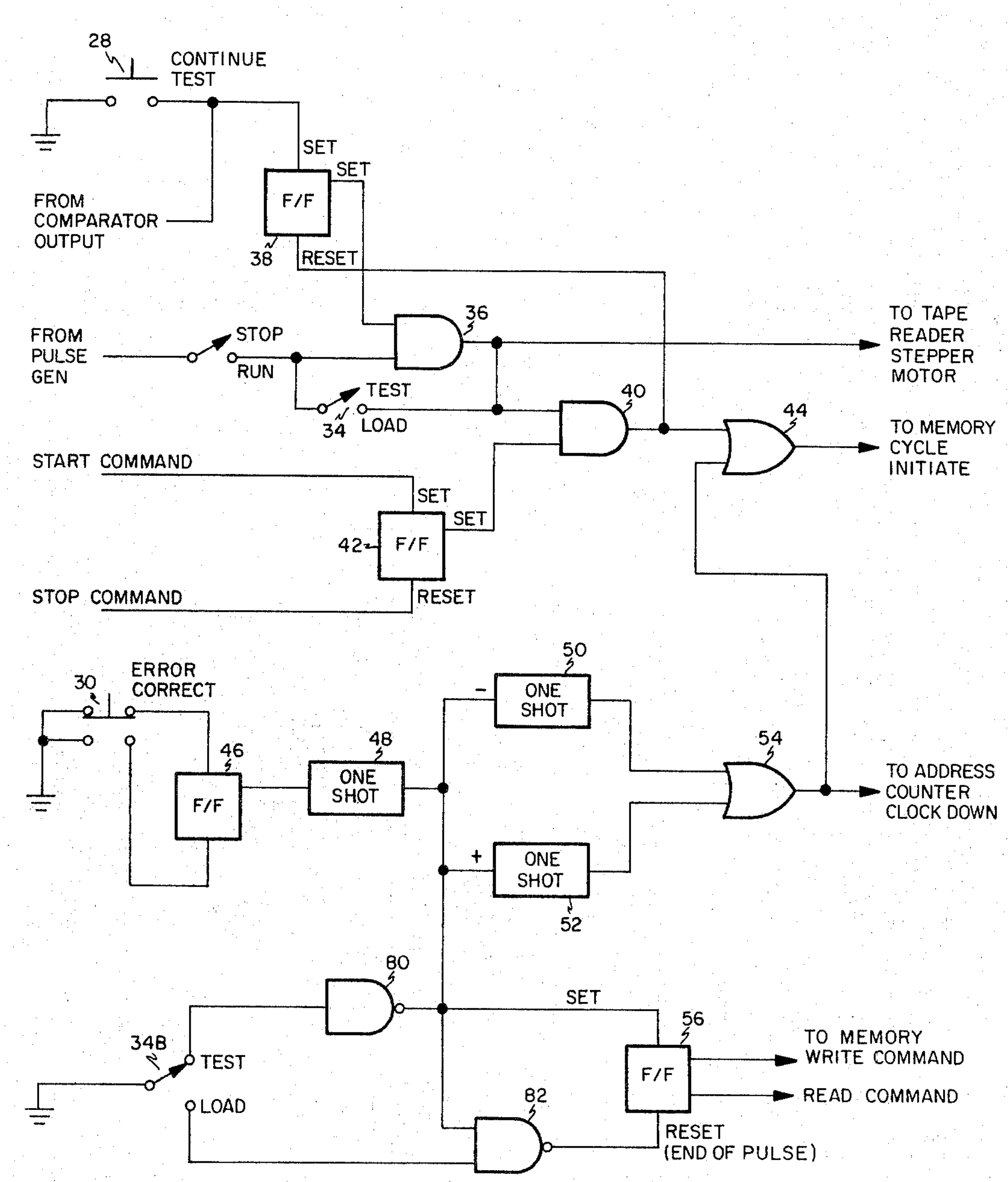
FIG. 2 illustrates the logic circuits of the block 4 in FIG. 1.

FIG. 2 is a circuit diagram showing the arrangement of logic circuit 4. When "stop-run" switch 24 and "test-load" switch 34 are closed pulses from pulse generator 1 (FIG. 1) are passed by an AND gate 36 to a stepping motor in tape reader 2, provided a flipflop 38 is "set." Flipflop 38 is set by an output signal from comparator 18 (FIG. 1). Flipflop 38 may be set by closing the "continue test" switch 28. The output of AND gate 36 is also connected to one input of an AND gate 40. A flipflop 42 has an output connected to a second input of AND gate 40. The output of AND gate 40 is connected through an OR gate 44 to memory 6 (FIG. 1) and supplies a "cycle initiate" pulse to the memory if flipflop 42 has been set by a start command from tape reader 2. Under these conditions memory 6 will cycle each time tape reader 2 steps. The output of AND gate 40 is also fed back over the line shown to reset flipflop 38. Therefore, assuming that memory 6 has been loaded with data derived from a tape and that the stored data is being compared with that on the tape, a pulse from the output of comparator 18 indicating that the current data in the memory and on the tape are identical sets flipflop 38. This is necessary for the test to continue. Switch 34 is provided to bypass gate 1 when memory 6 is being loaded.

If during a check of the data stored in memory 6 against the data on a tape a discrepancy occurs, comparator 18 will not have an output. Flipflop 38 will remain reset, gate 36 will be closed, tape reader 2 will not step, and memory 6 will not cycle. The operator must now determine whether there is an error in the data stored in the computer, on the tape, or in both. If the operator finds that the data in the computer are correct he can close the "continue test" switch 28 momentarily to set flipflop 38 and continue the checking operation.

If the word in the memory output register 14 is incorrect the operator can correct it automatically by momentarily moving the "correct error" switch 30 to its upper position. This switches a flipflop 46 which develops an output signal which in turn triggers a one-shot multivibrator 48. Flipflop 46 is provided to eliminate the effects of point bounce. When switch 30 is released it returns to its lower position thereby resetting flipflop 46 to a standby condition. The leading edge of the output pulse developed by one-shot 48 triggers a one-shot 50 and the trailing edge triggers a one-shot 52. The output signals developed by 50 and 52 are applied through an OR gate 54 to address counter 20 and through gate 54 and OR gate 44 to memory 6. The output of one-shot 48 is also applied over the lead shown to set a flipflop 56. The two output terminals of 56 are connected to memory 6 and when 56 is set, the memory is switched to a "write" mode. The output signals from one-shots 50 and 52 appearing on the output of OR gate 54 are two 250 nano-second pulses 10 microseconds apart. The first of these pulses from one-shot 50 is applied through gate 54 to step the address counter 20 backwards one step, and is simultaneously applied through OR gate 44 to memory 6 to initiate a write cycle to enter corrected data. When the pulse output of one-shot 48 ends flipflop 56 switches memory 6 back to a " mode. The second pulse through OR gate 54 from one-shot 52 steps the address counter 20 one count in a forward direction and initiates a "read" cycle. The memory output in register 14 should now be correct and the output of comparator 18 will set flipflop 38 and the test will continue.

If both the input information and the output information are incorrect, the input information is corrected first. Referring now to FIG. 3, this is done by closing the "clear input" switch 26 momentarily. This resets a flipflop 60 and sets a control flipflop 62. The output of flipflop 62 inactivates an AND gate 64 to prevent information from tape reader 2 from passing through an OR gate 66 to the input register 8 and to comparator 18. The output of 62 also enables an AND gate 68 which has an input connected to the output of flipflop 60 and an output connected to OR gate 66. A "Button-Lite" switch which is one of a plurality mounted on an instrument panel not shown may be pressed to set flipflop 60. There are a plurality of the circuits shown in FIG. 3 (except for clear-input switch 26 and control flipflop 62) connected to respective Button-Lite switches. All are controlled by switch 26 and flipflop 62. Thus selected Button-Lite switches are pressed to set selected flipflops such as 60 in FIG. 3 to enter a corrected multi-digit binary word. The operator now presses error-correct switch 30 to enter the corrected word into the input register 8. The Button-Lite may also comprise the input readout 12. INSERT switch 34B (ganged with switch 34) operating through gates 80 and 82 is used to set and reset flipflop 56 to place memory 6 in a write mode when loading and in a read mode when testing. The output pulse from one-shot 48 by-passes switch 34B momentarily when an error is being corrected during test.

Elements such as memory 6, input and output registers 8 and 14, input and output readouts 12 and 16, address readout 22 and address counter 20 as well as other elements may be parts of a general purpose computer. Tape reader 2 may be a standard commercially available item.

What is claimed is:

1. In a data processing system having a memory for storing data, the improvement comprising:
- tape reading means for transferring data from a tape to said memory,
- comparing means for comparing data stored in said memory with data on said tape and for signaling the presence of any discrepancy,
- means connected to said comparing means for correcting said discrepancy,
- said correcting means including manual means and automatic means connected to said manual means for correcting said discrepancy,
- an address counter connected to said memory for monitoring said memory,
- an address readout for indicating the state of said counter,
- input readout means for displaying data being read into said memory,
- output readout means for displaying data being read out of said memory,
- an input data register for temporary storage of input data for said memory,
- an output data register for temporary storage of output data from said memory,
- a pulse generator for driving said system,
- an input switching and manual loading circuit for forwarding data to said input data register from said tape reading means,
- a logic circuit for controlling said system,
- said input readout means being connected to said tape readout means through said input switching and manual loading circuit,
- said output readout means being connected to said output data register to display the data from said memory stored in said output data register.

2. The apparatus of claim 1 and including means connecting said tape reader to said input switching and manual loading means for forwarding data from said tape reader to said input switching and manual loading means,
- comparator connecting means enabling said comparing means to compare memory output data temporarily stored in said output data register with input data from said tape reader and said input switching and manual loading circuit, and for signaling the presence of any discrepancy to said logic circuit, said logic circuit comprising:
- gating means for passing a pulse from said pulse generator to step said tape reader and to initiate a cycle in said memory,
- a first flipflop responsive to said comparator and a second flipflop responsive to said tape reader for controlling said gating means,
- a third flipflop responsive to an error-correct switch to initiate pulses to initiate a cycle of said memory, step said address counter down, and to switch said memory to a write mode.

3. The apparatus of claim 2, said logic circuit comprising:
- a flipflop 38 connected to be set by an output from said comparison means 18 and by a continue-test switch 28,
- an AND gate 36 connected to be enabled by a set output from flipflop 38 to pass a pulse from said pulse generator 1,
- an AND gate 40,
- a flipflop 42 connected to be set by a start-command pulse and to be reset by a stop-command pulse from said tape reader 1,
- an enabling connection from the set output of flipflop 42 to an input of AND gate 40 enabling AND gate 40 to pass an output pulse from said AND gate 36,
- a reset connection from the output of AND gate 40 to flipflop 38,
- an OR gate 44 connected to pass an output pulse from AND gate 40 to initiate a cycle of said memory 6,
- a connection from the output of AND gate 36 to said tape reader 1,
- a flipflop 46,
- an error correct switch 30 connected to trigger said flipflop 46,
- a one-shot 48 connected to be triggered by an output from flipflop 46,
- a one-shot 50 connected to be triggered by the leading edge of an output pulse from one-shot 48,
- a one-shot 52 connected to be triggered by the trailing edge of an output pulse from one-shot 48,
- an OR gate 54 connected to pass the output pulses of one-shots 50 and 52 to said address counter 20, a flipflop 56 connected to be set by the leading edge of an output pulse from one-shot 48 and to be reset by the trailing edge of an output pulse from one-shot 48, a connection from the set output of flipflop 56 to forward a write command to memory 6, a connection from the reset output of flipflop 56 to forward a read command to memory 6, and a connection from the output of OR gate 54 to an input of OR gate 44 to pass the output pulses of one-shots 50 and 52 to said memory 6.

4. The apparatus of claim 3, said input switching and loading circuit comprising:

a flipflop 60, a switch 70 connected to set said flipflop 60, a control flipflop 62 connected to be reset by an output pulse from said comparing means, a clear-input switch 26 connected to reset said flipflop 60 and to set said control flipflop 62, an AND gate 69, a connection from a first output of said flipflop 62 to a first input of said AND gate 68, a connection from an output of said flipflop 60 to a second input of said AND gate 68, an AND gate 64, a connection from a second output of said control flipflop 62 to a first input of said AND gate 64, a connection from an output of said tape reader to a second input of said AND gate 64, an OR gate 66, a connection from the output of said AND gate 68 to a first input of said OR gate 66, a connection from the output of said AND gate 64 to a second input of said OR gate 66, a connection from the output of said OR gate 66 to an input of said comparing means and to an input of said input data register, and a connection between the output of said OR gate 66 and said switch 70, whereby the control flipflop 62 may be set to pass data from switch 70 to said comparison means 18 and to said input data register 8, and to inhibit data from said tape reading means 2, and may be reset to pass data from said tape reading means 2 and to inhibit data from said switch 70.

5. The apparatus of claim 4, said input switching and loading circuit comprising:

a plurality of switches 70, a like plurality of flipflops 60, a like plurality of gates 64, a like plurality of gates 66, and a like plurality of gates 68 all connected as described in claim 7 to form a like plurality of discrete circuits for switching and loading, all of said circuits being connected to clear-input switch 26 and control flipflop 62 in the manner described in claim 7.

* * * * *